United States Patent [19]

Röttger et al.

[11] Patent Number: 5,115,013

[45] Date of Patent: May 19, 1992

[54] GRAFT COPOLYMERS CONTAINING PERFLUOROALKYL GROUPS

[75] Inventors: Jutta Röttger, Cologne; Karl-Heinz Passon, Leverkusen; Wolf-Dieter Schröer, München; Wilfried Kortmann, deceased, late of Nachrodt-Wiblingwerde, all of Fed. Rep. of Germany, by Margot Kortmann, Bettina Kortmann, Axel Kortmann, heirs

[73] Assignee: Bayer Aktiengesellschaft, Leverkusen, Fed. Rep. of Germany

[21] Appl. No.: 686,321

[22] Filed: Apr. 12, 1991

[30] Foreign Application Priority Data

Apr. 20, 1990 [DE] Fed. Rep. of Germany ....... 4012630

[51] Int. Cl.$^5$ ............................................... C08F 8/12
[52] U.S. Cl. ..................................... 524/457; 524/507
[58] Field of Search ................................ 524/457, 507

[56] References Cited

U.S. PATENT DOCUMENTS 4,636,545 1/1987 Konig et al. ..................... 524/457
4,935,480 6/1990 Zdrahala et al. ................... 528/28

FOREIGN PATENT DOCUMENTS 0127061 5/1984 European Pat. Off. .
0156155 2/1985 European Pat. Off. .
0157138 9/1985 European Pat. Off. .
0339862 2/1989 European Pat. Off. .

OTHER PUBLICATIONS

WPIL, File Supplier, AN=85 034494 [06], Derwent Publications Ltd., London, GB & JP-A-59 228 076 (Toyobo) Dec. 21, 1984.
WPIL, File Supplier, AN=90 373458 [50], Derwent Publications Ltd. London, GB: & JP A 02 271 803.

Primary Examiner—Paul R. Michl
Assistant Examiner—Umakant Rajguru
Attorney, Agent, or Firm—Sprung Horn Kramer & Woods

[57] ABSTRACT

Aqueous dispersions of copolymers and/or graft copolymers composed of ethylenically unsaturated perfluoroalkyl monomers and perfluoroalkyl-free ethylenically unsaturated monomers can be prepared by polymerization in the presence of aqueous, emulsifier-free polyurethane dispersions as the graft base based on compounds containing perfluoroalkyl groups and active hydrogen atoms and compounds containing ionic and/or nonionic hydrophilic groups and active hydrogen atoms and polyisocyanates and can be used for the oil-repellent and water-repellent finishing of textiles, carpets, leather and paper.

8 Claims, No Drawings

GRAFT COPOLYMERS CONTAINING PERFLUOROALKYL GROUPS

BACKGROUND OF THE INVENTION

1. Field of the Invention

The present invention relates to aqueous dispersions of copolymers and/or graft copolymers composed of ethylenically unsaturated perfluoroalkyl monomers and perfluoroalkyl-free ethylenically unsaturated monomers, prepared by polymerisation in the presence of aqueous, emulsifierfree polyurethane dispersions as the graft base based on compounds containing perfluoroalkyl groups and active hydrogen atoms and compounds containing ionic and/or nonionic hydrophilic groups and active hydrogen atoms and polyisocyanates.

Preferred ionic groups are salt groups.

2. Description of the Related Art

Aqueous copolymer dispersions based on monomers containing perfluoroalkyl groups are known. They produce good oil-repellant finishes on many substrates as long as the perfluoroalkyl radicals are linear and contain at least 6 C atoms. When these copolymer dispersions are prepared by emulsion polymerisation, emulsifiers or emulsifier systems are used. Depending on the emulsifier system, anionically or cationically stabilised dispersions whose pot life can be improved by adding nonionic emulsifiers are obtained. Cationic perfluoroalkyl(meth)acrylate copolymer dispersions, also in combination with further finishing agents or textile auxiliaries, are particularly suitable for the oil-repellent finishing of textiles and carpets.

The effectiveness of the oil-repellent finishing agents based on polyperfluoroalkyl(meth)acrylate dispersions is largely dependent on the concentration of perfluoroalkyl groups in the copolymer, on the composition of the copolymer and on its particle size.

The type of emulsifiers used also affects the properties in practical applications. For practical applications, it is often necessary that the oil-repellent finish is additionally accompanied by a water-repellent finish.

Processes for preparing aqueous dispersions of graft copolymers are known. Graft copolymerisation using perfluoroalkyl(meth)acrylates in aqueous dispersion is described, for example, in DE-OS (German Published Specification) 3,407,361. The use of aqueous polyurethane dispersions as the graft base is explained in DE-OS (German Published Specification) 3,407,362, 1,953,345 and 1,953,349.

SUMMARY OF THE INVENTION

Compared with the known PU graft bases (DE-OS (German Published Specification) 3,407,362), the PU dispersions according to the invention contain perfluoroalkyl side chains and saturated and/or unsaturated partial esters of fatty acids.

By incorporating perfluoroalkyl chains, the compatibility of the graft base and graft is improved, which leads to a more homogeneous distribution of the two dispersions and thus also to a higher graft yield. At the same time, improved distribution of the perfluoroalkyl chains in the latex particles is also achieved. The dispersions obtained have an improved oil-repellent effect on the substrates finished therewith.

The partial esters of the long-chain fatty acids which are additionally used in the PU dispersions achieve a water-repellent effect not obtainable with conventional systems. The incorporation of partial esters of unsaturated fatty acids in the polymers of the graft base create additional graftable sites.

The emulsifiers necessary for preparing the dispersions have an adverse effect, in particular when used in high concentrations, on the ability to achieve the desired level of water-repellency. Moreover, emulsifiers are often the reason that the finished materials have a high dirt-retaining power.

To prepare finely divided dispersions which precisely because of this fine division are very effective, emulsifiers in general have to be used in high concentrations, which is a disadvantage. Since the graft base according to the invention has a self-emulsifying effect, the amount of emulsifier usually used for preparing perfluoroalkyl copolymer dispersions can be significantly reduced, which has a positive effect on the properties mentioned for practical applications.

The polymerisation is carried out by the process of graft copolymerisation, in which, independently of the graft yield, the overall amount of polymerisable monomers is designated as "graft".

DETAILED DESCRIPTION OF THE INVENTION

The copolymerisation is carried out in the presence of polyurethanes as the graft base, which, incorporated therein, contain the following structural components:

A) organic polyisocyanates
B) partial esters of fatty acids with polyols
C) compounds containing perfluoroalkyl groups and active hydrogen atoms, preferably alcohols
D) compounds containing active hydrogen atoms and salt groups or groups which can be converted into salt groups, preferably dihydroxy compounds.

Starting materials for preparing the polyurethane dispersions used as the graft base are:

A) Any desired organic polyisocyanates, preferably diisocyanates of the general formula $$Q(NCO)_2 \quad (I)$$

in which

Q represents an aliphatic, cycloaliphatic, aromatic or araliphatic hydrocarbon radical.

Examples of the preferred compounds of the formula (I) are tetramethylene diisocyanate, hexamethylene diisocyanate, 1,4-diisocyanatocyclohexane, 3-isocyanatomethyl-3,5,5-trimethylcyclohexyl isocyanate, 4,4'-diisocyanatodicyclohexylmethane, 4,4'-diisocyanato-3,3'-dimethyldicyclohexylmethane, 2,2'-(4,4'-diisocyanatodicyclohexyl)propane, 1,4-diisocyanatobenzene, 2,4- or 2,6-diisocyanatotoluene and isomeric mixtures thereof and 2,2'-(4,4'-diisocyanatodiphenyl)propane.

Diisocyanates (I) which are particularly preferably used are hexamethylene diisocyanate and the isomeric mixtures of 2,4- and 2,6-diisocyanatotoluene.

B) The partial esters of fatty acids carrying free hydroxyl groups are obtained by esterifying fatty acids with polyols, in which the polyols are at least trifunctional, but should preferably contain more than 3 hydroxyl groups, and a maximum of 6 hydroxyl groups.

Examples of suitable polyols are glycerol, pentaerythritol, trimethylolpropane, hexanetriol, sorbitol and saccharose.

Fatty acids which are considered suitable in the context of the invention are compounds of the formula $$RCOOH \quad (II)$$

in which

R represents an aliphatic radical having 5 to 21 carbon atoms, in particular 15 to 19 carbon atoms.

The aliphatic radical R can be either a saturated or an unsaturated alkyl chain, double bonds in the chain being advantageous for the graft yields.

Particularly suitable fatty acids (II) are: saturated fatty acids, such as stearic acid, arachidic acid, behenic acid, coconut fatty acid, perlagonic acid and/or unsaturated fatty acids, such as oleic acid, linseed oil fatty acid, soya oil fatty acid, tall oil fatty acid, linolic acid, elaidic acid and castor oil fatty acid.

C) Structural component C which carries fluorine atoms consists of perfluoroalkyl-containing bisalcohols of the general formula $$R_F(OH)_2 \quad (III)$$

in which $R_F$ represents a diradical having one or more perfluoroalkyl groups, in which the perfluoroalkyl chain contains 4 to 20 carbon atoms and can also be interrupted by oxygen and/or sulphur atoms.

The compounds of the formula (III) are preferably mono- or difunctional N-sulphonyl- or -carbonylperfluoroalkyl-aminoalkanol derivatives.

Examples of particularly highly suitable structural components (III) of this type are the following compounds.

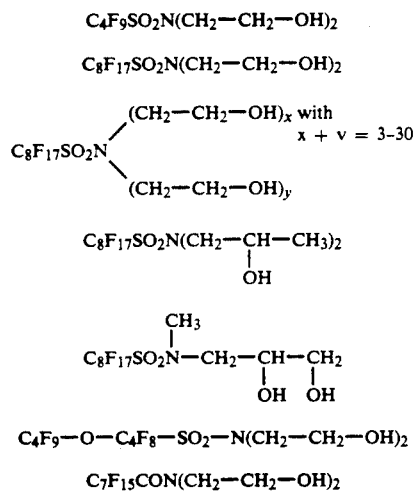

D) The self-emulsifying hydrophilic groups are incorporated in the polyurethanes according to the invention in the form of dihydroxy compounds which contain groups which can be converted into the salt form, such as carboxyl and/or sulpho groups or tertiary amino groups.

Examples of these are dimethylolpropionic acid, tartaric acid, bis($\beta$-hydroxyethoxy)benzoic acid, oxalkylated products of amino acids, such as bis($\beta$-hydroxyethyl)aminoacetic acid and bis($\beta$-hydroxyethyl)aminobenzoic acid and bis($\beta$-hydroxyethyl)aminobenzoic acid.

Examples of diolsulphonic acids are 1,4-dihydroxybutanesulphonic acid or oxalkylated products thereof, oxalkylated products of aminosulphonic acids, for example bis($\beta$-hydroxyethyl)taurine, bis($\beta$-hydroxyethyl)-4-aminobenzenesulphonic acid.

Bases, such as hydroxides of the alkali metals, but in particular ammonia and tertiary amines, such as triethylamine, tripropylamine, triethanolamine, and dimethylbenzylamine, and the like, serve for converting the carboxyl and/or sulpho groups into the corresponding salts unless this takes place by inner salt formation.

Tertiary amines which can be incorporated and converted into salts are suitable for preparing cationic polyurethanes. N-alkyl- and N-aralkyl- and N-aryldialkanolamines, for example N-methyldiethanolamine, N-ethyldipropanolamine, N-cyclohexyldiethanolamine, N-benzyldiethanolamine and N-phenyldiethanolamine, may be mentioned here in particular.

Quarternising agents and/or acids serve for salt formation. Examples are dimethyl sulphate, benzyl chloride, methyl p-toluenesulphonate, phosphoric acid, acetic acid, lactic acid, tartaric acid, benzoic acid and citric acid.

The amount of ionic structural component D is, as a rule, chosen such that the polyurethane dispersion has an ionic group content of quaternary ammonium groups, COO— or SO$_3$— groups of 2-200, preferably 2-100, milliequivalents per 100 g of polyurethane.

It is also possible to prepare as the graft base suitable polyurethane dispersions in which the preferred diisocyanates (structural component A) have been replaced by the corresponding polyisocyanates (structural component A') which are well known in polyurethane chemistry and which contain at least three NCO groups, such as, for example, triisocyanates, as the graft base. In this context, component C which contains bisfunctional perfluoroalkyl groups can be exchanged for a componet C' which contains monofunctional perfluoroalkyl groups and is reactive towards NCO groups.

Examples of suitable tri- or polyisocyanates are the following compounds, whose structure is shown here in idealised form:

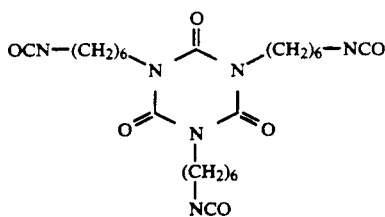

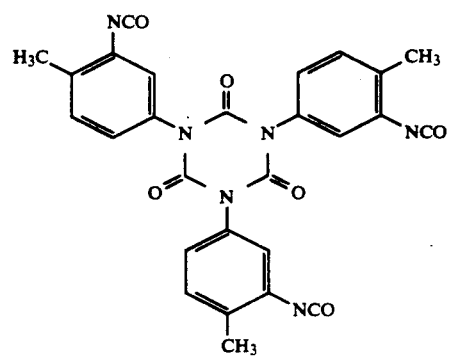

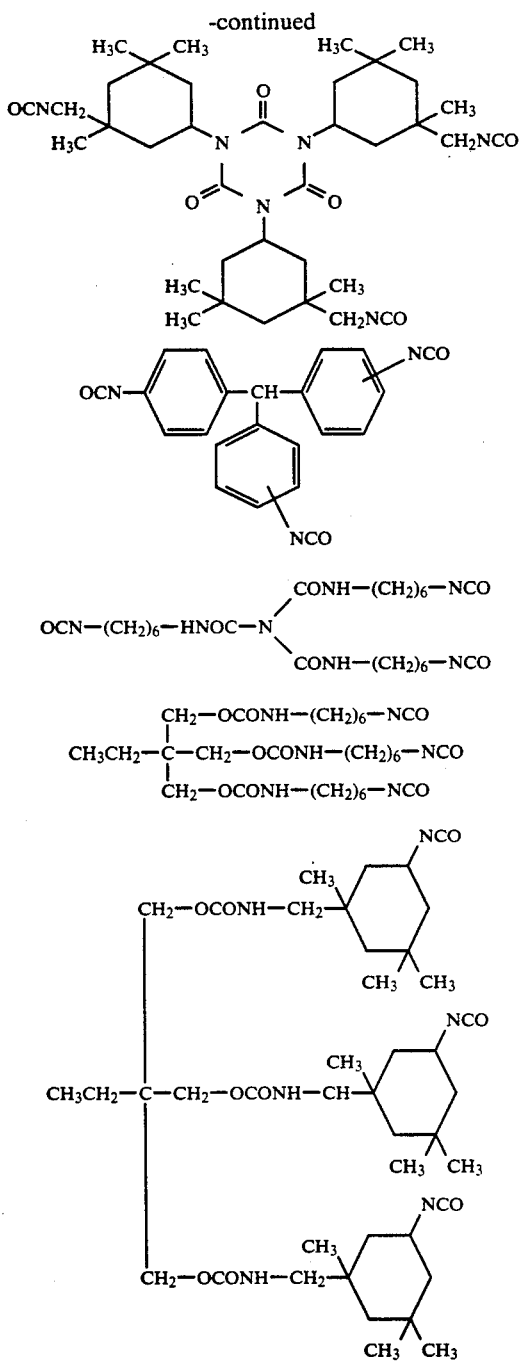

Preferred compounds which contain monofunctional perfluoroalkyl groups (structural components C') in the polyurethane dispersions are those of formulae:

$$C_nF_{2n+a}-(CH_2)_m-OH \quad \text{and} \quad \text{(IV)}$$

$$C_nF_{2n+1}-SO_2-\underset{R^1}{N}-(CH_2CH)_m-OH \quad \text{(V)}$$
with $R^2$ on the $CH_2CH$ group.

in which
n represents the numbers 4 to 16
m represents the numbers 1 to 4
$R^1$ represents $C_1$- to $C_4$-alkyl and
$R^2$ represents hydrogen or methyl.

Processes for preparing self-emulsifying aqueous polyurethane dispersions are known to one skilled in the art. The polyurethane dispersions according to the invention described here are prepared by the so-called "acetone process", as mentioned, for example, in DE-OS (German Published Specification) 1,495,745 and U.S. Pat. No. 3,479,310.

The polyurethanes are prepared from the starting components A, B, C, D, or A', B, C', D in several steps. The relative amounts of the components are chosen such that the equivalent ratio of isocyanate groups of the educts A or A' to groups of educts B, C, D or B, C', D which can be reactive towards isocyanate groups is 0.8:1 to 1.2:1, preferably 0.85:1 to 1.15:1.

Relative to 1 mol of isocyanate groups of component A, components B, C and D are used in such amounts that 0.2 to 0.6 mol of hydroxyl groups of component B, preferably 0.3 to 0.5 mol of hydroxyl groups, 0.15 to 0.35 mol of hydroxyl groups of component C, preferably 0.2 to 0.3 mol of hydroxyl groups, and 0.15 to 0.35 mol of hydroxyl groups of component D, preferably 0.2 to 0.3 mol of hydroxyl groups, are available for the isocyanate reaction.

Relative to 1 mol of isocyanate groups of component A', components B, C' and D are used in such amounts that 0.1 to 0.3 mol of hydroxyl groups of component B, preferably 0.15 to 0.25 mol of hydroxyl groups, 0.25 to 0.45 mol of hydroxyl groups of component C', preferably 0.3 to 0.4 mol of hydroxyl groups, and 0.25 to 0.55 mol of hydroxyl groups of component D, preferably 0.3 to 0.5 mol of hydroxyl groups, are made to react in the isocyanate reaction.

The fluorine content in the polyurethane dispersions is 5 to 30%, preferably 8 to 25%, of fluorine, relative to the solid.

The polyurethanes described above, which are used as the graft base, are water-dispersible compounds.

The solids concentration of the PU dispersion is adjusted to about 10 to 40%, in particular 10–30%, by adding water.

The abovementioned polyurethane dispersions are used as the graft base in amounts of 2 to 50, preferably 5 to 35% by weight, relative to the overall amount of the monomers used for preparing the graft.

The graft is synthesised from ethylenically unsaturated perfluoroalkyl monomers and perfluoroalkyl-free ethylenically unsaturatured monomers.

Suitable perfluoroalkyl monomers are those of the formula $$C_qF_{2q+1}-Z-O-\underset{\underset{}{\overset{\overset{O}{\|}}{}}}{C}-\underset{\underset{R^2}{|}}{C}=CH_2 \quad \text{(VI)}$$

in which
q represents the numbers 4 to 12,
$R^2$ represents hydrogen or methyl, and
Z represents the grouping $$-(CH_2)_m-, \quad -O-(CH_2)_m- \text{ or}$$

$$-SO_2-\underset{R^1}{N}-CH_2-\underset{\underset{}{\overset{R^2}{|}}}{CH}-$$

in which
m represents numbers 1 to 4, and $R^1$ represents the $C_1$–$C_4$-alkyl, such as, for example, methyl, ethyl, n-propyl, i-propyl, n-butyl, i-butyl or t-butyl.

Preference is given to perfluoroalkyl monomers of the formula (VI) in which $R^2$ and Z have the abovementioned meaning and
$R^1$ represents methyl or ethyl,
m represents the number 2, and
q represents the numbers 6 to 8.

Suitable perfluoroalkyl-free monomers are compounds of the formulae

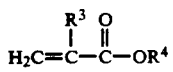
(VII)

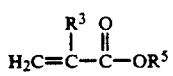
(VIIIa)

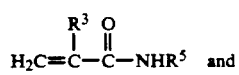
(VIIIb)

and

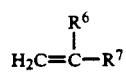
(VIIIc)

in which
$R^3$ represents hydrogen, methyl or fluorine,
$R^4$ represents $C_8$–$C_{22}$-alkyl,
$R^5$ represents

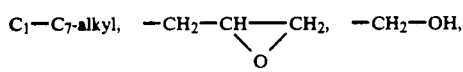

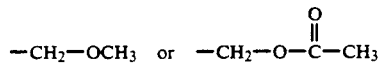

$R^6$ represents hydrogen, methyl, fluorine or chlorine, and
$R^7$ represents fluorine, chlorine, cyano, phenyl or

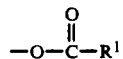

Preference is given to those monomers of the formula (VII) in which
$R^3$ represents hydrogen or methyl and
$R^4$ represents $C_{12}$–$C_{22}$-alkyl.

Examples are: acrylic or methacrylic esters of behenyl alcohol, stearyl alcohol, oleyl alcohol, nonyl or octyl alcohol or isomeric mixtures of these alcohols.

Preferred monomers (VIII) are vinyl esters such as vinyl acetate or vinyl propionate and acrylic and methacrylic esters of $C_1$–$C_4$-alkanols.

The grafts preferably contain the individual types of comonomers in the relative amounts shown below:

perfluoroalkyl monomers of formulae (VI) 15 to 70% by weight, preferably 25 to 60% by weight, comonomers of formula (VII) 5 to 35% by weight, preferably 10 to 25% by weight, comonomers of formula (VIII) 15 to 65% by weight, preferably 20 to 55% by weight.

In general, water-insoluble comonomers are preferred, although it is also possible to use water-soluble comonomers in amounts of up to 10% by weight, preferably 2% by weight, in order to ensure a certain adhesion to the different substrates in the oil-repellent/water-repellent finish.

The copolymer dispersions according to the invention are prepared by the process of emulsion polymerisation in water. The perfluoroalkyl monomers are dissolved, if necessary with the use of solution aids, homogeneously together with the other comonomers. Suitable solution aids are solvents which have little effect on the course of the emulsion polymerisation, for example alcohols, such as methanol, ethanol, n-propanol, isopropanol and tert-butanol, ketones, such as acetones, methylethyl ketone and isobutylmethyl ketone, ethers, such as tetrahydrofuran, and amides, such as dimethylacetamide (U.S. Pat. No. 3,403,122). It is often advantageous to use as solution aids solvents which are not or only to a limited extent miscible with water, such as esters of lower alcohols with lower carboxylic acids, provided no ester hydrolysis can take place under the conditions of emulsion polymerisation. The use of ethyl acetate, methyl acetate, methyl propionate or methylethyl ketone is particularly advantageous. The solution aid is removed after the polymerisation is complete.

The emulsion is prepared in stirred apparatuses, ultrasound apparatuses or homogenisers.

The polymerisation is initiated by free-radical formers. Examples of free-radical formers are aliphatic azo compounds, such as azodiisobutyronitrile, and organic or inorganic peroxides. Suitable organic peroxides are: diacyl peroxides, such as dibenzoyl peroxide, hydroperoxides, such as tert-butyl hydroperoxide, and percarbonates, such as dicyclohexyl percarbonates. Suitable inorganic peroxides are in particular the alkali metal salts of peroxydisulphonic acids.

The polymerisation temperatures are in general 50 to 100° C., preferably 60°–90° C.

It is also possible to carry out the copolymerisation at temperatures of 40° C. and below by using redox systems. Suitable starter systems are, for example, mixtures of peroxydisulphates and reducing sulphur compounds, such as bisulphite or thiosulphates, or combinations of diacyl peroxides with tertiary amines. The desired molecular weights or molecular weight distributions can be obtained by using the known chain-transfer agents based on mercapto compounds or aliphatic aldehydes.

The polymerisation can be coupled with a graft copolymerisation in which portions of the copolymer are grafted onto the polyurethanes used.

This additionally increases the stability of the copolymer dispersion according to the invention. Graft reactions of this type are described, for example, by H. Gerrens in "Fortschritte der Hochpolymerforschung" (Progress in High-Polymer Research"), Vol. I (1959), p. 300.

The aqueous dispersions according to the invention can contain further polymers, such as described, for example, in DOS (German Published Specification) 3,407,361 and 3,407,362, in particular hydrophobic vinyl polymers (IX) or polycondensation products (X), such as described, for example, in DE-OS (German Published Specification) 956,990, if appropriate as additional graft base, preferably in amounts of 8% by weight to 30% by weight, relative to the copolymer composed of (VI), (VII) and (VIII).

Examples of suitable vinyl polymers (IX) are (meth)acrylate copolymers, such as isobutyl methacrylate or butyl acrylate, containing at least one comonomer having a hydrophobic alkyl radical, such as, for example, stearyl methacrylate. Examples of suitable polycondensation products (X) are urea resins and melamine resins, such as obtained, for example, by reaction of hexamethylolmelamine pentamethyl ether with fatty acids and, where, appropriate, with methyldialkanolamine, as described, for example, in EP 324,354.

A particular embodiment in this context is the combination of such a melamine condensation product with paraffin fractions or paraffin waxes.

Conventional cation-active, anion-active or nonionic emulsifiers and combinations of ionic and nonionic emulsifiers are used for preparing the monomer emulsions by the process of emulsion polymerisation.

Examples of cationic emulsifiers used are quaternary ammonium or pyridinium salts, for example stearyldimethylbenzylammonium chloride or N,N,N-trimethyl-N-perfluorooctanesulphonamidopropylammonium chloride.

Examples of anionic emulsifiers are alkyl sulphonates, alkylaryl sulphonates, fatty alcohol sulphates or sulphosuccinic esters, furthermore emulsifiers containing perfluoroalkyl groups, such as ammonium or tetraethylammonium salts of perfluorooctanesulphonic acid or the potassium salt of N-ethyl-N-perfluorooctanesulphonyl glycine. Nonionic emulsifiers increase in particular the shelf life of the copolymer dispersions.

Examples of nonionic emulsifiers are polyglycol ethers, for example ethylene oxide/propylene oxide copolymer, including those having block structure, and alkoxylation products, in particular ethoxylation products of fatty alcohols, alkyl phenols, fatty acids, fatty amides, sorbitol monooleate.

As a result of the self-emulsifying effect of the PU dispersions, the customarily used amount of emulsifier can significantly be reduced. This has a positive effect on the water-repellent and oil-repellent effects of the polymer latices (JA 63 214,331).

In a preferred embodiment, the graft copolymerisation of (VI), (VII), (VIII) and the polyurethane dispersions used as the graft base is carried out in the presence of (IX) and/or (X) as additional graft bases. (IX) and (X) are preferably used in this process in the form of aqueous dispersions.

The dispersions according to the invention are highly suitable for the treatment of natural and synthetic materials, such as leather, paper, fibres, filaments, yarns, non-wovens, and woven or knitted fabrics, in particular carpets, made in particular of cellulose and derivatives thereof, but also of polyester, polyamide and polyacrylonitrile materials, wool or silk, which are provided by the dispersions according to the invention with oil-repellent and water-repellent properties.

The dispersions according to the invention can also be used in combination with further fluorine-containing or fluorine-free dispersions.

For the finishing of carpets, the graft copolymers according to the invention are used in the form of aqueous dispersions, preferably in combination with aqueous colloidal suspensions of organosiloxanes, such as described, for example, in DE-A (German Published Specification) 3,307,420, and, if appropriate, in an additional combination with other fluorine-containing dispersions.

Surprisingly, it has now been found that the dispersions according to the invention have significantly improved oil-repellent and water-repellent effects on the substrates finished therewith, such as textiles, leather and paper.

The dispersions according to the invention can be successfully used for obtaining oil-repellent and waterrepellent finishes of natural and synthetic materials, such as leather, paper, fibres, filaments, yarns, nonwovens, and woven and knitted fabrics, in particular carpets, made in particular of cellulose and derivatives thereof, but also of polyester, polyamide and polyacrylonitrile materials, wool or silk.

When using the dispersions according to the invention, prepared by using the abovementioned polyurethane dispersions as the graft base, improved oil-repellent and water-repellent properties are achieved with smaller amounts of emulsifier being necessary for stabilising the polymer latices.

Conventional oil-repellent/water-repellent finishing agents in general contain emulsifiers in high concentrations, which is a disadvantage and has an adverse effect on the level of water-repellency which can be achieved. Furthermore, the emulsifiers lead to dirt-retaining properties of the goods finished therewith. When using the graft copolymer dispersions according to the invention, the disadvantages described can be avoided.

The finishing is carried out by normal processes, such as, for example, exhaust or padding processes, for example, between room temperature and 40° C., but also by face-padding, spraying or foam application, followed by a heat treatment at 80° to 180° C., preferably 120° to 150° C.

Preparation of graft bases

I. Polyurethane dispersions

EXAMPLE A 143.4 g of commercial grade glycerol monostearate of OH number 229 were refluxed together with 200 g of anhydrous acetone and 3 g of 1,4-diazabicyclo[2.2.2]octane. Solution 1 consisting of 134.4 g of hexamethylene diisocyanate in 100 g of anhydrous acetone was added to this mixture over a period of 1.5 hours. The reaction mixture was reacted under reflux until the NCO content had dropped to about 7.3%. Solution 2 consisting of 117.4 g of N,N-bis(2-hydroxyethyl)perfluorooctylsulphonamide in 250 g of anhydrous acetone was metered in over a period of 1.5 hours. The mixture was then refluxed for about 1 hour. After an NCO content of 2.7% had been reached, solution 3 consisting of 23.8 g of N-methyldiethanolamine in 50 g of acetone was added, and the mixture was stirred for another 5.5 hours. 100 g of glacial acetic acid was added to form the salt. The mixture was stirred for another hour, and 1680 g of deionised water at 60° C. was added over a period of 1.5 hours. The acetone was removed by vacuum distillation to give an approximately 20% strength dispersion.

$N^+$: 47.7 m equivalents per 100 g
Solids content: 20%
Fluorine content: 15.4%, relative to the solid

EXAMPLE B 110.8 g of commercial grade hexamethylene diisocyanate trimer (NCO content: 19.4%), 150 g of anhydrous acetone and 2.5 g of 1,4-diazabicyclo[2.2.2.]octane were heated to reflux. Solution 1 consisting of 100.2 g of N-methyl-N-(2-hydroxyethyl)perfluorooctanesulphonamide, dissolved in 150 g of anhydrous acetone, were metered into this solution over a period 1 hour. After reaction time of about 2.5 hours, an NCO content of 2.8% had been reached. Solution 2 consisting of 19.2 g of glycerol monooleate (OH number 261) and 100 g of anhydrous acetone was added dropwise over a period of 1 hour. After 2.5 hours, the NCO content was 1.7%. The addition of solution 3 consisting of 11.94 g of N-methyldiethanolamine in 100 g of anhydrous acetone and additional stirring under reflux (5.5 hours) led to the complete conversion of the isocyanate groups.

After metering in 40 g of glacial acetic acid to form the salt, the mixture was again refluxed for 1 hour. 968 g of deionised water at 60° C. were then introduced over a period of 1.5 hours and the acetone was then distilled off in vacuum.

N+: 41.4 m equivalents per 100 g
Solids content: 20%
Fluorine content: 24%, relative to the solid

EXAMPLE C

The following starting compounds were used:
126.0 g of glycerol monooleate (OH number: 261)
200.0 g of anhydrous acetone
3.0 g of 1,4-diazabicyclo[2.2.2]octane (DABCO)
Solution 1:
134.4 g of hexamethylene diisocyanate in 100.0 g of acetone
Solution 2:
117.4 g of N,N-bis(2-hydroxyethyl)per fluorooctylsulphonamide in 250.0 g of acetone
Solution 3:
23.8 g of N-methyldiethanolamine in 50.0 g of acetone
50.0 g of glacial acetic acid
1606.0 g of deionised water The reaction was carried out analogously to Example A.

N+: 49.8 m equivalents per 100 g
Solids content: 20%
Fluorine content: 16.1%, relative to the solid

EXAMPLE D

The following starting compounds were used:
126.0 g of glycerol monooleate (OH number: 261)
200.0 g of anhydrous acetone 3.0 g of DABCO
Solution 1:
126.0 g of hexamethylene diisocyanate in 100.0 g of acetone (NCO content 6.9%)
Solution 2:
78.8 g of N,N-bis(2-hydroxyethyl)perfluorobutylsulphonamide in 250.0 g of acetone (NCO content 2.4%)
Solution 3:
23.8 g of N-methyldiethanolamine in 50.0 g of acetone
100.0 g of glacial acetic acid 1408.0 g of deionised water The reaction was carried out analogously to Example A.

N+: 56.4 m equivalents per 100 g
Solids content: 22%
Fluorine content: 9.8%, relative to the solid II. Hydrophobic polycondensation product

EXAMPLE E

Melamine condensation products which can be used as the graft base, as described, for example, in DOS (German Published Specification) 3,800,845 in U.S Pat. No. 2,398,569, can be obtained by reacting, for example, methylol products of aminotriazines or etherification and esterification products thereof, for example with aliphatic carboxylic acids and with amines in the course of a polycondensation reaction. For this purpose, first the carboxylic acid can be reacted with the melamine derivative and then the amino component can be reacted (see German Specification Patent 956,990).

For example, the following was prepared as the graft base:

A mixture of 50% by weight of a condensation product prepared from 1 mol of hexamethylolmelamine pentamethyl ether, 1.5 mol of behenic acid and 0.9 mol of N-methyldiethanolamine at 130° C. over a period of 3 hours and 50% by weight of paraffin of melting point 52° C.

Preparation of the copolymerisation dispersions according to the invention

EXAMPLE 1

The following solutions were prepared at 50° C.:

| Solution 1: | 119.25 parts by weight of the dispersion obtained by Example A |
| --- | --- |
| | 6.1 parts by weight of an ethoxylated nonylphenol containing 10 ethylene oxide units |
| | 6.25 parts by weight of benzyldodecyl-dimethylammonium chloride |
| | 540 parts by weight of deionised water |
| Solution 2: | 450 parts by weight of ethyl acetate |
| | 43.4 parts by weight of N-methyl-N-perfluoro-octanesulphonamidoethyl methacrylate |
| | 12.7 parts by weight of stearyl methacrylate |
| | 18.45 parts by weight of vinyl acetate |
| | 14.6 parts by weight of the graft base obtained by Example E. |

The following solution was prepared at 30° C.:

| Solution 3: | 0.268 parts by weight of t-butyl perpivalate |
| --- | --- |
| | 0.918 parts by weight of dilauryl peroxide |
| | 6.0 parts by weight of ethyl acetate |

Solutions 1 and 2 were mixed, and this mixture was emulsified at 50° C. in an emulsifying apparatus. The emulsion obtained was placed into a reactor equipped with stirrer, reflux condenser and internal thermometer and allowed to cool to 30° C. Solution 3 was added at 30° C., and the mixture was stirred at 30°-40° C. for one hour. The temperature was then increased to 60° C. over a period of half an hour, and the mixture was stirred at 60°-70° C. for one and a half hours. The temperature was then kept at 70°-80° C. for three hours, during which the ethyl acetate was distilled off through an additionally connected distillation bridge. Stirring at 83°-85° C. was then continued for another three hours.

Solids content: 14.9%
Fluorine content in the solid: 21.4%
Average particle size: 390 nm (after light scattering)

EXAMPLE 2

The following solution was prepared at 50° C.:

| Solution 1: | 116.8 parts by weight of the dispersion obtained by Example B |
| --- | --- |
| | 6.1 parts by weight of an ethoxylated nonylphenol containing 10 ethylene oxide units |
| | 6.25 parts by weight of benzyldodecyl-dimethylammonium chloride |
| | 540.0 parts by weight of deionised water |

The preparation of solutions 2 and 3 and the polymerisation was carried out analogous to Example 1.

Solids content: 16.2%
Fluorine content in the solid: 23.3%
Average particle size: 340 nm (after light scattering)

COMPARATIVE EXPERIMENT 1

A copolymer dispersion was prepared as described in Example 1, without, however, using the dispersion obtained by Example A.
Solids content: 13.4%
Fluorine content in the solid: 23.2%

The dispersion had a shelf life of only about two weeks; after that it separated into two phases.

EXAMPLE 3

The following solution was prepared at 50° C.:

| Solution 1: | 138.5 parts by weight of the dispersion obtained by Example B |
| --- | --- |
| | 10.25 parts by weight of an ethoxylated nonylphenol containing 10 ethylene oxide units |
| | 4.25 parts by weight of benzyldodecyl-dimethylammonium chloride |
| | 540.0 parts by weight of deionised water |

Solutions 2 and 3 were prepared analogously to Example 1.

Solutions 1 and 2 were mixed, and the mixture was emulsified at 50° C. in an emulsifying apparatus. The emulsion obtained was placed into a reactor equipped with stirrer, reflux condenser and internal thermometer and allowed to cool to 30° C. Solution 3 was added at 30° C., and the mixture was stirred at 30°–40° C. for half an hour. Stirring at 60° to 70° C. was continued for one and a half hours. The mixture was then allowed to react at 70° to 80° C. for three hours, during which the ethyl acetate was distilled off through an additionally connected distillation bridge. Stirring at 83° to 85° C. was continued for a further three hours and at 85° to 90° C. for one hour.
Solids content: 16.8%
Fluorine content in the solid: 21.4%
Average particle size: 196 nm (after light scattering)

COMPARATIVE EXPERIMENT 2

A copolymer dispersion was prepared as described in Example 3, without, however, using the dispersion obtained by Example B.
Solids content: 14.3%
Fluorine content in the solid: 22.8%
Particle size: 471 nm (after light scattering)

EXAMPLE 4

The following solution was prepared at 50° C.:

| Solution 1: | 159.00 parts by weight of the dispersion obtained by Example C |
| --- | --- |
| | 6.10 parts by weight of an ethoxylated nonylphenol containing 10 ethylene oxide units |
| | 6.25 parts by weight of benzyldodecyl-dimethylammonium chloride |
| | 540.0 parts by weight of deionised water |

The preparation of solutions 2 and 3 and the reaction took place analogously to Example 1.
Solids content: 15.1%
Fluorine content in the solid: 23.3%
Average particle size: 471 nm (after light scattering)

EXAMPLE 5

The following solution was prepared at 50° C.:

| Solution 1: | 143.10 parts by weight of the dispersion obtained by Example D |
| --- | --- |
| | 6.10 parts by weight of an ethoxylated nonylphenol containing 10 ethylene oxide units |
| | 6.25 parts by weight of benzyldodecyl-dimethylammonium chloride |
| | 540.0 parts by weight of deionised water |

The preparation of solutions 2 and 3 and the reaction took place analogously to Example 2.
Solids content: 15.4%
Fluorine content in the solid: 23.3%
Average particle size: 514 nm (after light scattering)

EXAMPLE OF USING THE COPOLYMER DISPERSIONS ACCORDING TO THE INVENTION

An aqueous dispersion was prepared according to Example 1. 40 parts by weight of this dispersion were mixed with 60 parts by weight of an aqueous colloidal suspension of organosiloxanes, as described in DE 3,307,420.

A 2.5% strength aqueous dilution of this mixture was applied to a polyamide carpet (tufting goods having 30% of residual moisture, pile rate: 500 g/m$^2$) in such a manner (spray application) that a deposit of 1% by weight of the abovementioned mixture (relative to the pile weight) remained on the carpet.

It was then dried at 125°–150° C. for 5 to 15 minutes and condensed, air-conditioned at 23° C. and 65% relative humidity for 24 hours, after which the tests for practical application were carried out.

In an analogous manner, dispersions prepared by Examples 2 to 5 were used for the finishing of polyamide carpets.

Table 1 shows the results in practical application which are obtained by using the copolymer dispersions prepared by Examples 1 to 5 in the oil-repellant/water-repellant finishing of carpets based on synthetic polyamide fibres and the results of the comparative experiments (VV1, VV2) which are not according to the invention.

TABLE 1

| | Oil-repellancy[1] | Water-repellancy[2] |
| --- | --- | --- |
| Example 1 | 3 | 20/80 |
| Example 2 | 5 | 20/80 |
| VV1 | 1 | 70/30 |
| Example 3 | 4 | 20/80 |
| VV2 | 0 | 90/10–80/20 |
| Example 4 | 4 | 70/30 |
| Example 5 | 2 | 70/30 |

[1]According to AATCC Test Method 118 (5 better than 4)
[2]Resistance to aqueous isopropanol solutions (water/-isopropanol = 60/40 better than 70/30)

Compared with copolymer dispersions prepared without using a polyurethane dispersion (comparative experiments VV1 and VV2), a significant improvement not only in the oil-repellent but also in the water-repellent effect was obtained by using the copolymer dispersions according to the invention. The soil-resistant properties of the carpets finished using these copolymer dispersions was also improved and fulfilled increased requirements.

What is claimed is:

1. An aqueous dispersion of copolymers and/or graft copolymers composed of ethylenically unsaturated perfluoroalkyl monomers and perfluoroalkyl-free ethylenically unsaturated monomers, prepared by polymerisation in the presence of aqueous, emulsifier-free polyurethane dispersions as the graft base wherein the polyurethanes contain the following structural components incorporated therein:

A) organic polyisocyanates
B) partial esters of fatty acids with polyols
C) compounds containing perfluoroalkyl groups and active hydrogen atoms
D) compounds containing active hydrogen atoms and salt groups or groups which can be converted into salt groups, the polyurethane dispersion characterized in that it has a fluorine content of 5 to 30%, relative to the solid, the said aqueous dispersion characterized in that the perfluoroalkyl monomers have the formula $$C_qF_{2q+1}-Z-O-\overset{O}{\underset{\|}{C}}-\overset{R^2}{\underset{|}{C}}=CH_2 \quad (VI)$$

in which
q represents the numbers 4 to 12,
$R^2$ represents hydrogen or methyl, and
Z represents the grouping $$-(CH_2)_m-, \quad -O-(CH_2)_m- \text{ or}$$

$$-SO_2-N-CH_2-\overset{R^2}{\underset{|}{CH}}-$$
$$\quad\quad\underset{R^1}{|}$$

in which
m represents numbers 1 to 4, and
$R^1$ represents the $C_1$–$C_4$-alkyl.

2. The aqueous dispersion according to claim 1, characterized in that the perfluoroalkyl-free monomers have the formulae $$H_2C=\overset{R^3}{\underset{|}{C}}-\overset{O}{\underset{\|}{C}}-OR^4 \quad (VII)$$

$$H_2C=\overset{R^3}{\underset{|}{C}}-\overset{O}{\underset{\|}{C}}-OR^5 \quad (VIIIa)$$

$$H_2C=\overset{R^3}{\underset{|}{C}}-\overset{O}{\underset{\|}{C}}-NHR^5 \text{ and} \quad (VIIIb)$$

$$H_2C=\overset{R^6}{\underset{|}{C}}-R^7 \quad (VIIIc)$$

in which
$R^3$ represents hydrogen, methyl or fluorine,
$R^4$ represents $C_8$–$C_{22}$-alkyl,
$R^5$ represents $$C_1-C_7\text{-alkyl}, \quad -CH_2-\underset{\underset{O}{\diagdown\diagup}}{CH}-CH_2, \quad -CH_2-OH,$$

$$-CH_2-OCH_3 \text{ or } -CH_2-O-\overset{O}{\underset{\|}{C}}-CH_3$$

$R^6$ represents hydrogen, methyl, fluorine or chlorine, and
$R^7$ represents fluorine, chlorine, cyano, phenyl or $$-O-\overset{O}{\underset{\|}{C}}-R^1$$

3. An aqueous dispersion according to claim 1, characterized in that the perfluoroalkyl-free monomers used are vinyl esters, acrylic or methacrylic esters of $C_1$–$C_4$-alkanols or acrylic or methacrylic esters of $C_{12}$–$C_{22}$-alkanols.

4. Mixtures of aqueous dispersions according to claim 1 and hydrophobic vinyl polymers (IX) or polycondensation products (X).

5. Mixtures according to claim 4, characterized in that the hydrophobic vinyl polymers (IX) used are (meth)acrylate copolymers containing at least one comonomer having a hydrophobic alkyl radical and the polycondensation products (X) used are urea resins and melamine resins.

6. An aqueous dispersion according to claim 1, characterized in that hydrophobic vinyl polymers (IX) or polycondensation products (X) are used as additional graft bases.

7. An aqueous dispersion according to claim 6, characterized in that the hydrophobic vinyl polymers (IX) and the polycondensation products (X) correspond to those described in claim 5.

8. The use of aqueous dispersions according to claim 1 for the finishing of natural or synthetic cellulose-, polyester-, polyamide- or polyacrylonitrile-containing materials.

* * * * *